US008182624B2

(12) United States Patent
Handziak (10) Patent No.: US 8,182,624 B2
(45) Date of Patent: May 22, 2012

(54) REGISTERED STRETCH LAMINATE AND METHODS FOR FORMING A REGISTERED STRETCH LAMINATE

(75) Inventor: Perry T. Handziak, Belgium, WI (US)

(73) Assignee: Curt G. Joa, Inc., Sheboygan Falls, WI (US)

( * ) Notice: Subject to any disclaimer, the term of this patent is extended or adjusted under 35 U.S.C. 154(b) by 592 days.

(21) Appl. No.: 12/381,364

(22) Filed: Mar. 11, 2009

(65) Prior Publication Data

US 2009/0242098 A1 Oct. 1, 2009

Related U.S. Application Data

(60) Provisional application No. 61/069,111, filed on Mar. 12, 2008.

(51) Int. Cl.
*B32B 37/00* (2006.01)
(52) U.S. Cl. .................. 156/73.1; 156/164; 156/229
(58) Field of Classification Search .................. 156/73.1, 156/160, 161, 163, 164, 166, 229, 494, 580.1, 156/580.2; 264/442, 443, 444
See application file for complete search history.

(56) References Cited

U.S. PATENT DOCUMENTS

| | | | |
|---|---|---|---|
| 135,145 A | 1/1873 | Murphy | |
| 293,353 A | 2/1884 | Purvis | |
| 312,257 A | 2/1885 | Cotton et al. | |
| 410,123 A | 8/1889 | Stilwell | |
| 432,742 A | 7/1890 | Stanley | |
| 643,821 A | 2/1900 | Howlett | |
| 1,393,524 A | 10/1921 | Grupe | |
| 1,605,842 A | 2/1926 | Jones | |
| 1,686,595 A | 10/1928 | Belluche | |
| 1,957,651 A | 5/1934 | Joa | |
| 2,009,857 A | 7/1935 | Potdevin | |
| 2,054,832 A | 9/1936 | Potdevin | |
| 2,117,432 A | 5/1938 | Linscott | |
| 2,128,746 A | 8/1938 | Joa | |
| 2,131,808 A | 10/1938 | Joa | |
| 2,171,741 A | 5/1939 | Cohn et al. | |
| 2,164,408 A | 7/1939 | Joa | |
| 2,167,179 A | 7/1939 | Joa | |
| 2,213,431 A | 9/1940 | Joa | |
| 2,254,290 A | 9/1941 | Joa | |
| 2,254,291 A | 9/1941 | Joa | |

(Continued)

FOREIGN PATENT DOCUMENTS

BE 1007854 11/1995

(Continued)

OTHER PUBLICATIONS

Franklin Jones; Reciprocating Mechanisms, Ingenious Mechanism for Designers and Inventors; vol. 1; pp. 292-295.

(Continued)

*Primary Examiner* — James Sells
(74) *Attorney, Agent, or Firm* — Ryan, Kromholz & Manion, S.C.

(57) ABSTRACT

An elastic netting like product is carried between two outer layers of material, such as nonwoven or non-stretch material, which are bonded together at the open areas of the netting like structure. The resulting laminate allows for the outer layers of the laminate to be directly bonded to each other without the stretch engine material being introduced into the bond.

20 Claims, 3 Drawing Sheets

U.S. PATENT DOCUMENTS

| | | |
|---|---|---|
| 2,282,477 A | 5/1942 | Joa |
| 2,286,096 A | 6/1942 | Joa |
| 2,296,931 A | 9/1942 | Joa |
| 2,304,571 A | 12/1942 | Joa |
| 2,324,930 A | 7/1943 | Joa |
| 2,345,937 A | 4/1944 | Joa |
| 2,466,240 A | 4/1949 | Joa |
| 2,481,929 A | 9/1949 | Joa |
| 2,510,229 A | 6/1950 | Joa |
| 2,540,844 A | 2/1951 | Strauss |
| 2,584,002 A | 1/1952 | Elser et al. |
| 2,591,359 A | 4/1952 | Joa |
| 2,618,816 A | 11/1952 | Joa |
| 2,702,406 A | 2/1955 | Reed |
| 2,721,554 A | 10/1955 | Joa |
| 2,730,144 A | 1/1956 | Joa |
| 2,772,611 A | 12/1956 | Heywood |
| 2,780,253 A | 2/1957 | Joa |
| 2,785,609 A | 3/1957 | Billeb |
| 2,811,905 A | 11/1957 | Kennedy, Jr. |
| 2,839,059 A | 6/1958 | Joa |
| 2,842,169 A | 7/1958 | Joa |
| 2,851,934 A | 9/1958 | Heywood |
| 2,875,724 A | 3/1959 | Joa |
| 2,913,862 A | 11/1959 | Sabee |
| 2,939,461 A | 6/1960 | Joa |
| 2,939,646 A | 6/1960 | Stone |
| 2,960,143 A | 11/1960 | Joa |
| 2,990,081 A | 6/1961 | Neui et al. |
| 2,991,739 A | 7/1961 | Joa |
| 3,016,207 A | 1/1962 | Comstock |
| 3,016,582 A | 1/1962 | Joa |
| 3,017,795 A | 1/1962 | Joa |
| 3,020,687 A | 2/1962 | Joa |
| 3,021,135 A | 2/1962 | Joa |
| 3,024,957 A | 3/1962 | Pinto |
| 3,053,427 A | 9/1962 | Wasserman |
| 3,054,516 A | 9/1962 | Joa |
| 3,069,982 A | 12/1962 | Heywood et al. |
| 3,086,253 A | 4/1963 | Joa |
| 3,087,689 A | 4/1963 | Heim |
| 3,091,408 A | 5/1963 | Schoeneman |
| 3,114,994 A | 12/1963 | Joa |
| 3,122,293 A | 2/1964 | Joa |
| 3,128,206 A | 4/1964 | Dungler |
| 3,203,419 A | 8/1965 | Joa |
| 3,230,955 A | 1/1966 | Joa et al. |
| 3,268,954 A | 8/1966 | Joa |
| 3,288,037 A | 11/1966 | Burnett |
| 3,289,254 A | 12/1966 | Joa |
| 3,291,131 A | 12/1966 | Joa |
| 3,301,114 A | 1/1967 | Joa |
| 3,322,589 A | 5/1967 | Joa |
| 3,342,184 A | 9/1967 | Joa |
| 3,356,092 A | 12/1967 | Joa |
| 3,360,103 A | 12/1967 | Johnson |
| 3,363,847 A | 1/1968 | Joa |
| 3,391,777 A | 7/1968 | Joa |
| 3,454,442 A | 7/1969 | Heller, Jr. |
| 3,463,413 A | 8/1969 | Smith |
| 3,470,848 A | 10/1969 | Dreher |
| 3,484,275 A | 12/1969 | Lewicki, Jr. |
| 3,502,322 A | 3/1970 | Cran |
| 3,521,639 A | 7/1970 | Joa |
| 3,526,563 A | 9/1970 | Schott, Jr. |
| 3,538,551 A | 11/1970 | Joa |
| 3,540,641 A | 11/1970 | Besnyo et al. |
| 3,575,170 A | 4/1971 | Clark |
| 3,607,578 A | 9/1971 | Berg et al. |
| 3,635,462 A | 1/1972 | Joa |
| 3,656,741 A | 4/1972 | Macke et al. |
| 3,666,611 A | 5/1972 | Joa |
| 3,673,021 A | 6/1972 | Joa |
| 3,685,818 A | 8/1972 | Burger |
| 3,728,191 A | 4/1973 | Wierzba et al. |
| 3,751,224 A | 8/1973 | Wackerle |
| 3,758,102 A | 9/1973 | Munn et al. |
| 3,772,120 A | 11/1973 | Radzins |
| 3,776,798 A | 12/1973 | Milano |
| 3,796,360 A | 3/1974 | Alexeff |
| 3,811,987 A | 5/1974 | Wilkinson et al. |
| 3,816,210 A | 6/1974 | Aoko et al. |
| 3,847,710 A | 11/1974 | Blomqvist et al. |
| 3,854,917 A | 12/1974 | McKinney et al. |
| 3,883,389 A | 5/1975 | Schott, Jr. |
| 3,888,400 A | 6/1975 | Wiig |
| 3,901,238 A | 8/1975 | Gellert et al. |
| 3,903,768 A | 9/1975 | Amberg |
| 3,904,147 A | 9/1975 | Taitel et al. |
| 3,918,698 A | 11/1975 | Coast |
| 3,960,646 A | 6/1976 | Wiedamann |
| 3,988,194 A | 10/1976 | Babcock et al. |
| 3,991,994 A | 11/1976 | Farish |
| 4,002,005 A | 1/1977 | Mueller et al. |
| 4,003,298 A | 1/1977 | Schott, Jr. |
| 4,009,814 A | 3/1977 | Singh |
| 4,009,815 A | 3/1977 | Ericson et al. |
| 4,053,150 A | 10/1977 | Lane |
| 4,056,919 A | 11/1977 | Hirsch |
| 4,081,301 A | 3/1978 | Buell |
| 4,090,516 A | 5/1978 | Schaar |
| 4,094,319 A | 6/1978 | Joa |
| 4,103,595 A | 8/1978 | Corse |
| 4,106,974 A | 8/1978 | Hirsch |
| 4,108,584 A | 8/1978 | Radzins et al. |
| 4,136,535 A | 1/1979 | Audas |
| 4,141,193 A | 2/1979 | Joa |
| 4,141,509 A | 2/1979 | Radzins |
| 4,142,626 A | 3/1979 | Bradley |
| 4,157,934 A | 6/1979 | Ryan et al. |
| 4,165,666 A | 8/1979 | Johnson et al. |
| 4,168,776 A | 9/1979 | Hoeboer |
| 4,171,239 A | 10/1979 | Hirsch et al. |
| 4,205,679 A | 6/1980 | Repke et al. |
| 4,208,230 A | 6/1980 | Winch |
| 4,213,356 A | 7/1980 | Armitage |
| 4,215,827 A | 8/1980 | Roberts et al. |
| 4,222,533 A | 9/1980 | Pongracz |
| 4,223,822 A | 9/1980 | Clitheroe |
| 4,231,129 A | 11/1980 | Winch |
| 4,236,955 A | 12/1980 | Prittie |
| 4,275,510 A | 6/1981 | George |
| 4,284,454 A | 8/1981 | Joa |
| 4,307,800 A | 12/1981 | Joa |
| 4,316,756 A | 2/1982 | Wilson |
| 4,342,206 A | 8/1982 | Rommel |
| 4,364,787 A | 12/1982 | Radzins |
| 4,374,576 A | 2/1983 | Ryan |
| 4,379,008 A | 4/1983 | Gross et al. |
| 4,394,898 A | 7/1983 | Campbell |
| 4,411,721 A | 10/1983 | Wishart |
| 4,452,597 A | 6/1984 | Achelpohl |
| 4,492,608 A | 1/1985 | Hirsch et al. |
| 4,501,098 A | 2/1985 | Gregory |
| 4,508,528 A | 4/1985 | Hirsch et al. |
| 4,522,853 A | 6/1985 | Szonn et al. |
| 4,543,152 A | 9/1985 | Nozaka |
| 4,551,191 A | 11/1985 | Kock et al. |
| 4,586,199 A | 5/1986 | Birring |
| 4,589,945 A | 5/1986 | Focke et al. |
| 4,603,800 A | 8/1986 | Focke et al. |
| 4,608,115 A | 8/1986 | Schroth et al. |
| 4,614,076 A | 9/1986 | Rathmacher |
| 4,619,357 A | 10/1986 | Radzins et al. |
| 4,634,482 A | 1/1987 | Lammers |
| 4,641,381 A | 2/1987 | Heran et al. |
| 4,642,150 A | 2/1987 | Stemmler |
| 4,642,839 A | 2/1987 | Urban |
| 4,650,530 A | 3/1987 | Mahoney et al. |
| 4,663,220 A | 5/1987 | Wisnecki et al. |
| 4,672,705 A | 6/1987 | Bors et al. |
| 4,675,016 A | 6/1987 | Meuli et al. |
| 4,675,062 A | 6/1987 | Instance |
| 4,675,068 A | 6/1987 | Lundmark |
| 4,686,136 A * | 8/1987 | Homonoff et al. ............ 442/247 |
| 4,693,056 A | 9/1987 | Raszewski |
| 4,701,239 A | 10/1987 | Craig |

| | | | | | |
|---|---|---|---|---|---|
| 4,720,415 A * | 1/1988 | Vander Wielen et al. ...... 428/152 | 5,407,513 A | 4/1995 | Hayden et al. |
| 4,723,698 A | 2/1988 | Schoonderbeek | 5,415,649 A | 5/1995 | Watanabe et al. |
| 4,726,874 A | 2/1988 | VanVliet | 5,421,924 A | 6/1995 | Ziegelhoffer et al. |
| 4,726,876 A | 2/1988 | Tomsovic et al. | 5,424,025 A | 6/1995 | Hanschen |
| 4,743,241 A | 5/1988 | Igaue et al. | 5,429,576 A | 7/1995 | Doderer-Winkler |
| 4,751,997 A | 6/1988 | Hirsch | 5,435,802 A | 7/1995 | Kober |
| 4,753,429 A | 6/1988 | Irvine et al. | 5,449,353 A | 9/1995 | Watanabe et al. |
| 4,756,141 A | 7/1988 | Hirsch et al. | 5,464,401 A | 11/1995 | Hasse et al. |
| 4,764,325 A | 8/1988 | Angstadt | 5,486,253 A | 1/1996 | Otruba |
| 4,765,780 A | 8/1988 | Angstadt | 5,494,622 A | 2/1996 | Heath et al. |
| 4,776,920 A | 10/1988 | Ryan | 5,500,075 A | 3/1996 | Herrmann |
| 4,777,513 A | 10/1988 | Nelson | 5,516,392 A | 5/1996 | Bridges et al. |
| 4,782,647 A | 11/1988 | Williams et al. | 5,518,566 A | 5/1996 | Bridges et al. |
| 4,785,986 A | 11/1988 | Daane et al. | 5,525,175 A | 6/1996 | Blenke et al. |
| 4,795,510 A | 1/1989 | Wittrock et al. | 5,531,850 A | 7/1996 | Herman |
| 4,798,353 A | 1/1989 | Peugh | 5,540,647 A | 7/1996 | Weiermann et al. |
| 4,801,345 A | 1/1989 | Dussaud et al. | 5,545,275 A | 8/1996 | Herrin et al. |
| 4,802,570 A | 2/1989 | Hirsch et al. | 5,545,285 A | 8/1996 | Johnson |
| 4,840,609 A | 6/1989 | Jones et al. | 5,552,013 A | 9/1996 | Ehlert et al. |
| 4,845,964 A | 7/1989 | Bors et al. | 5,556,360 A | 9/1996 | Kober et al. |
| 4,864,802 A | 9/1989 | D'Angelo | 5,556,504 A | 9/1996 | Rajala et al. |
| 4,880,102 A | 11/1989 | Indrebo | 5,560,793 A | 10/1996 | Ruscher et al. |
| 4,888,231 A | 12/1989 | Angstadt | 5,575,187 A | 11/1996 | Dieterlen |
| 4,892,536 A | 1/1990 | Des Marais et al. | 5,586,964 A | 12/1996 | Chase |
| 4,904,440 A | 2/1990 | Angstadt | 5,602,747 A | 2/1997 | Rajala |
| 4,908,175 A | 3/1990 | Angstadt | 5,603,794 A | 2/1997 | Thomas |
| 4,909,019 A | 3/1990 | Delacretaz et al. | 5,624,420 A | 4/1997 | Bridges et al. |
| 4,915,767 A | 4/1990 | Rajala et al. | 5,624,428 A | 4/1997 | Sauer |
| 4,917,746 A | 4/1990 | Kons | 5,628,738 A | 5/1997 | Suekane |
| 4,925,520 A | 5/1990 | Beaudoin et al. | 5,634,917 A | 6/1997 | Fujioka et al. |
| 4,927,322 A | 5/1990 | Schweizer et al. | 5,643,165 A | 7/1997 | Klekamp |
| 4,927,486 A | 5/1990 | Fattal et al. | 5,643,396 A | 7/1997 | Rajala et al. |
| 4,927,582 A | 5/1990 | Bryson | 5,645,543 A | 7/1997 | Nomura et al. |
| 4,937,887 A | 7/1990 | Schreiner | 5,659,229 A | 8/1997 | Rajala |
| 4,963,072 A | 10/1990 | Miley et al. | 5,660,657 A | 8/1997 | Rajala et al. |
| 4,987,940 A | 1/1991 | Straub et al. | 5,660,665 A | 8/1997 | Jalonen |
| 4,994,010 A | 2/1991 | Doderer-Winkler | 5,683,376 A | 11/1997 | Kato et al. |
| 5,000,806 A | 3/1991 | Merkatoris et al. | 5,683,531 A | 11/1997 | Roessler et al. |
| 5,021,111 A | 6/1991 | Swenson | RE35,687 E | 12/1997 | Igaue et al. |
| 5,025,910 A | 6/1991 | Lasure et al. | 5,693,165 A | 12/1997 | Schmitz |
| 5,045,039 A | 9/1991 | Bay | 5,699,653 A | 12/1997 | Hartman et al. |
| 5,062,597 A | 11/1991 | Martin et al. | 5,707,470 A | 1/1998 | Rajala et al. |
| 5,064,179 A | 11/1991 | Martin | 5,711,832 A | 1/1998 | Glaug et al. |
| 5,064,492 A | 11/1991 | Friesch | 5,725,518 A | 3/1998 | Coates |
| 5,080,741 A | 1/1992 | Nomura et al. | 5,743,994 A | 4/1998 | Roessler et al. |
| 5,094,658 A | 3/1992 | Smithe et al. | 5,745,922 A | 5/1998 | Rajala et al. |
| 5,096,532 A | 3/1992 | Neuwirth et al. | 5,746,869 A | 5/1998 | Hayden et al. |
| 5,108,017 A | 4/1992 | Adamski et al. | 5,749,989 A | 5/1998 | Linman et al. |
| 5,109,767 A | 5/1992 | Nyfeler et al. | 5,766,389 A | 6/1998 | Brandon et al. |
| 5,110,403 A | 5/1992 | Ehlert | 5,788,797 A | 8/1998 | Herrin et al. |
| 5,127,981 A | 7/1992 | Straub et al. | 5,817,199 A | 10/1998 | Brennecke et al. |
| 5,131,525 A | 7/1992 | Musschoot | 5,829,164 A | 11/1998 | Kotitschke |
| 5,131,901 A | 7/1992 | Moll | 5,836,931 A | 11/1998 | Toyoda et al. |
| 5,133,511 A | 7/1992 | Mack et al. | 5,858,012 A | 1/1999 | Yamaki et al. |
| 5,147,487 A | 9/1992 | Nomura et al. | 5,865,393 A | 2/1999 | Kreft et al. |
| 5,163,594 A | 11/1992 | Meyer | 5,868,727 A | 2/1999 | Barr et al. |
| 5,171,239 A | 12/1992 | Igaue et al. | 5,876,027 A | 3/1999 | Fukui et al. |
| 5,176,244 A | 1/1993 | Radzins et al. | 5,876,792 A | 3/1999 | Caldwell |
| 5,183,252 A | 2/1993 | Wolber et al. | 5,879,500 A | 3/1999 | Herrin et al. |
| 5,188,627 A | 2/1993 | Igaue et al. | 5,902,431 A | 5/1999 | Wilkinson et al. |
| 5,190,234 A | 3/1993 | Ezekiel | 5,932,039 A | 8/1999 | Popp et al. |
| 5,195,684 A | 3/1993 | Radzins | 5,938,193 A | 8/1999 | Bluemle et al. |
| 5,203,043 A | 4/1993 | Riedel | 5,964,390 A | 10/1999 | Borresen et al. |
| 5,213,645 A | 5/1993 | Nomura et al. | 5,964,970 A | 10/1999 | Woolwine et al. |
| 5,222,422 A | 6/1993 | Benner, Jr. et al. | 6,036,805 A | 3/2000 | McNichols |
| 5,223,069 A | 6/1993 | Tokuno et al. | 6,043,836 A | 3/2000 | Kerr et al. |
| 5,226,992 A | 7/1993 | Morman | 6,050,517 A | 4/2000 | Dobrescu et al. |
| 5,246,433 A | 9/1993 | Hasse et al. | 6,074,110 A | 6/2000 | Verlinden et al. |
| 5,252,228 A | 10/1993 | Schaupp | 6,076,442 A | 6/2000 | Arterburn et al. |
| 5,267,933 A | 12/1993 | Precoma | 6,098,249 A | 8/2000 | Toney et al. |
| 5,273,228 A | 12/1993 | Yoshida et al. | 6,123,792 A | 9/2000 | Samida et al. |
| 5,275,676 A | 1/1994 | Rooyakkers et al. | 6,171,432 B1 | 1/2001 | Brisebois et al. |
| 5,308,345 A | 5/1994 | Herrin | 6,183,576 B1 | 2/2001 | Couillard et al. |
| 5,328,438 A | 7/1994 | Crowley | 6,210,386 B1 | 4/2001 | Inoue |
| 5,340,424 A | 8/1994 | Matsushita | 6,212,859 B1 | 4/2001 | Bielik, Jr. et al. |
| 5,368,893 A | 11/1994 | Sommer et al. | 6,214,147 B1 | 4/2001 | Mortellite et al. |
| 5,389,173 A | 2/1995 | Merkatoris et al. | 6,250,048 B1 | 6/2001 | Linkiewicz |
| 5,393,360 A | 2/1995 | Bridges et al. | 6,264,784 B1 | 7/2001 | Menard et al. |
| 5,407,507 A | 4/1995 | Ball | 6,276,421 B1 | 8/2001 | Valenti et al. |

| | | |
|---|---|---|
| 6,276,587 B1 | 8/2001 | Borresen et al. |
| 6,284,081 B1 | 9/2001 | Vogt et al. |
| 6,287,409 B1 | 9/2001 | Stephany |
| 6,306,122 B1 | 10/2001 | Narawa et al. |
| 6,309,336 B1 | 10/2001 | Muessig et al. |
| 6,312,420 B1 | 11/2001 | Sasaki et al. |
| 6,314,333 B1 | 11/2001 | Rajala et al. |
| 6,315,022 B1 | 11/2001 | Herrin et al. |
| 6,336,921 B1 | 1/2002 | Kato et al. |
| 6,358,350 B1 | 3/2002 | Glaug et al. |
| 6,369,291 B1 | 4/2002 | Uchimoto et al. |
| 6,375,769 B1 | 4/2002 | Quereshi et al. |
| 6,391,013 B1 | 5/2002 | Suzuki et al. |
| 6,416,697 B1 | 7/2002 | Venturino et al. |
| 6,431,038 B2 | 8/2002 | Couturier |
| 6,440,246 B1 | 8/2002 | Vogt et al. |
| 6,443,389 B1 | 9/2002 | Palone |
| 6,446,795 B1 | 9/2002 | Allen et al. |
| 6,473,669 B2 | 10/2002 | Rajala et al. |
| 6,475,325 B1 | 11/2002 | Parrish et al. |
| 6,478,786 B1 | 11/2002 | Gloug et al. |
| 6,482,278 B1 | 11/2002 | McCabe et al. |
| 6,494,244 B2 | 12/2002 | Parrish et al. |
| 6,521,320 B2 | 2/2003 | McCabe et al. |
| 6,523,595 B1 | 2/2003 | Milner et al. |
| 6,524,423 B1 | 2/2003 | Hilt et al. |
| 6,533,879 B2 | 3/2003 | Quereshi et al. |
| 6,540,857 B1 | 4/2003 | Coenen et al. |
| 6,551,228 B1 | 4/2003 | Richards |
| 6,551,430 B1 | 4/2003 | Glaug et al. |
| 6,554,815 B1 | 4/2003 | Umebayashi |
| 6,569,275 B1 | 5/2003 | Popp et al. |
| 6,572,520 B2 | 6/2003 | Blumle |
| 6,581,517 B1 | 6/2003 | Becker et al. |
| 6,585,841 B1 | 7/2003 | Popp et al. |
| 6,589,149 B1 | 7/2003 | VanEperen et al. |
| 6,596,108 B2 | 7/2003 | McCabe |
| 6,605,172 B1 | 8/2003 | Anderson et al. |
| 6,605,173 B1 | 8/2003 | Glaug et al. |
| 6,637,583 B1 | 10/2003 | Andersson |
| 6,648,122 B1 | 11/2003 | Hirsch et al. |
| 6,649,010 B2 | 11/2003 | Parrish et al. |
| 6,656,309 B1 | 12/2003 | Parker et al. |
| 6,659,150 B1 | 12/2003 | Perkins et al. |
| 6,659,991 B2 | 12/2003 | Suckane |
| 6,675,552 B2 | 1/2004 | Kunz et al. |
| 6,684,925 B2 | 2/2004 | Nagate et al. |
| 6,722,494 B2 | 4/2004 | Nakakado |
| 6,743,324 B2 | 6/2004 | Hargett et al. |
| 6,750,466 B2 | 6/2004 | Guha et al. |
| 6,758,109 B2 | 7/2004 | Nakakado |
| 6,766,817 B2 | 7/2004 | Dias da Silva |
| 6,808,582 B2 | 10/2004 | Popp et al. |
| D497,991 S | 11/2004 | Otsubo et al. |
| 6,820,671 B2 | 11/2004 | Calvert |
| 6,837,840 B2 | 1/2005 | Yonekawa et al. |
| 6,840,616 B2 | 1/2005 | Summers |
| 6,852,186 B1 | 2/2005 | Matsuda et al. |
| 6,875,202 B2 | 4/2005 | Kumasaka et al. |
| 6,893,528 B2 | 5/2005 | Middelstadt et al. |
| 6,918,404 B2 | 7/2005 | Dias da Silva |
| 6,978,486 B2 | 12/2005 | Zhou et al. |
| 7,045,031 B2 | 5/2006 | Popp et al. |
| 7,066,586 B2 | 6/2006 | de Silva |
| 7,077,393 B2 | 7/2006 | Ishida |
| 7,130,710 B2 | 10/2006 | Popp et al. |
| 7,172,666 B2 | 2/2007 | Groves et al. |
| 7,195,684 B2 | 3/2007 | Satoh |
| 7,201,345 B2 | 4/2007 | Werner et al. |
| 7,214,174 B2 | 5/2007 | Allen et al. |
| 7,214,287 B2 | 5/2007 | Akihisa |
| 7,247,219 B2 | 7/2007 | O'Dowd |
| 7,303,708 B2 | 12/2007 | Andrews et al. |
| 7,380,213 B2 | 5/2008 | Pokorny et al. |
| 7,398,870 B2 | 7/2008 | McCabe |
| 7,452,436 B2 | 11/2008 | Andrews |
| 7,533,709 B2 | 5/2009 | Meyer |
| 7,537,215 B2 | 5/2009 | Beaudoin et al. |
| 7,587,966 B2 | 9/2009 | Nakakado et al. |
| 7,618,513 B2 | 11/2009 | Meyer |
| 7,638,014 B2 | 12/2009 | Coose et al. |
| 7,640,962 B2 | 1/2010 | Meyer et al. |
| 7,703,599 B2 | 4/2010 | Meyer |
| 7,708,849 B2 | 5/2010 | McCabe |
| 7,770,712 B2 | 8/2010 | McCabe |
| 7,780,052 B2 | 8/2010 | McCabe |
| 7,811,403 B2 | 10/2010 | Andrews |
| 7,861,756 B2 | 1/2011 | Jenquin et al. |
| 7,909,956 B2 | 3/2011 | Coose et al. |
| 7,975,584 B2 | 7/2011 | McCabe |
| 7,987,964 B2 | 8/2011 | McCabe |
| 8,007,484 B2 | 8/2011 | McCabe et al. |
| 8,007,623 B2 | 8/2011 | Andrews |
| 8,011,493 B2 | 9/2011 | Giuliani et al. |
| 8,016,972 B2 | 9/2011 | Andrews et al. |
| 2001/0012813 A1 | 8/2001 | Bluemle |
| 2001/0017181 A1 | 8/2001 | Otruba et al. |
| 2002/0046802 A1 | 4/2002 | Tachibana et al. |
| 2002/0059013 A1 | 5/2002 | Rajala et al. |
| 2002/0096241 A1 | 7/2002 | Instance |
| 2002/0125105 A1 | 9/2002 | Nakakado |
| 2002/0162776 A1 | 11/2002 | Hergeth |
| 2003/0000620 A1 | 1/2003 | Herrin et al. |
| 2003/0015209 A1 | 1/2003 | Gingrass et al. |
| 2003/0051802 A1 | 3/2003 | Hargett |
| 2003/0052148 A1 | 3/2003 | Rajala et al. |
| 2003/0066585 A1 | 4/2003 | McCabe |
| 2003/0083638 A1 | 5/2003 | Malee |
| 2003/0084984 A1 | 5/2003 | Glaug |
| 2003/0089447 A1 | 5/2003 | Molee et al. |
| 2003/0121614 A1 | 7/2003 | Tabor |
| 2003/0135189 A1 | 7/2003 | Umebayashi |
| 2004/0007328 A1 | 1/2004 | Popp et al. |
| 2004/0016500 A1 | 1/2004 | Tachibana et al. |
| 2004/0087425 A1 | 5/2004 | Tony et al. |
| 2004/0112517 A1 | 6/2004 | Groves et al. |
| 2004/0164482 A1 | 8/2004 | Edinger |
| 2005/0000628 A1 | 1/2005 | Norrley |
| 2005/0022476 A1 | 2/2005 | Hamer et al. |
| 2005/0077418 A1 | 4/2005 | Werner et al. |
| 2005/0139713 A1 | 6/2005 | Weber et al. |
| 2005/0196538 A1 | 9/2005 | Sommer et al. |
| 2005/0230056 A1 | 10/2005 | Meyer et al. |
| 2005/0230449 A1 | 10/2005 | Meyer et al. |
| 2005/0233881 A1 | 10/2005 | Meyer et al. |
| 2005/0234412 A1 | 10/2005 | Andrews et al. |
| 2005/0245881 A1 | 11/2005 | Meyer et al. |
| 2005/0257881 A1 | 11/2005 | Coose et al. |
| 2005/0275148 A1 | 12/2005 | Beaudoin et al. |
| 2006/0021300 A1 | 2/2006 | Tada et al. |
| 2006/0137298 A1 | 6/2006 | Oshita et al. |
| 2006/0224137 A1 | 10/2006 | McCabe et al. |
| 2006/0265867 A1 | 11/2006 | Schaap |
| 2007/0074953 A1 | 4/2007 | McCabe |
| 2008/0223537 A1 | 9/2008 | Wiedmann |
| 2009/0020211 A1 | 1/2009 | Andrews et al. |
| 2010/0078119 A1 | 4/2010 | Yamamoto |
| 2010/0078120 A1 | 4/2010 | Otsubo |
| 2010/0078127 A1 | 4/2010 | Yamamoto |
| 2010/0193138 A1 | 8/2010 | Eckstein |
| 2010/0193155 A1 | 8/2010 | Nakatani |

FOREIGN PATENT DOCUMENTS

| | | |
|---|---|---|
| CA | 1146129 | 5/1983 |
| CA | 1153345 | 9/1983 |
| CA | 1190078 | 7/1985 |
| CA | 1210744 | 9/1986 |
| CA | 1212132 | 9/1986 |
| CA | 1236056 | 5/1988 |
| CA | 1249102 | 1/1989 |
| CA | 1292201 | 11/1991 |
| CA | 1307244 | 9/1992 |
| CA | 1308015 | 9/1992 |
| CA | 1310342 | 11/1992 |
| CA | 2023816 | 3/1994 |
| CA | 2404154 | 10/2001 |
| CA | 2541194 | 1/2006 |
| CA | 2559517 | 5/2007 |

| | | |
|---|---|---|
| CA | 2337700 | 8/2008 |
| CA | 2407867 | 6/2010 |
| DE | 60123502 | 10/2006 |
| DE | 60216550 | 12/2006 |
| DE | 102006047280 | 4/2007 |
| EP | 0044206 | 1/1982 |
| EP | 0048011 | 3/1982 |
| EP | 0089106 | 9/1983 |
| EP | 0099732 | 2/1984 |
| EP | 0206208 | 6/1986 |
| EP | 0304140 | 8/1987 |
| EP | 0439897 | 2/1990 |
| EP | 0455231 | 11/1991 |
| EP | 510251 | 10/1992 |
| EP | 0652175 | 5/1995 |
| EP | 0811473 | 12/1997 |
| EP | 0901780 | 3/1999 |
| EP | 0990588 | 4/2000 |
| EP | 1132325 | 9/2001 |
| EP | 1199057 | 4/2002 |
| EP | 1272347 | 1/2003 |
| EP | 1366734 | 12/2003 |
| EP | 1571249 | 9/2005 |
| EP | 1619008 | 1/2006 |
| EP | 1707168 | 4/2006 |
| EP | 1726414 | 11/2006 |
| EP | 1302424 | 12/2006 |
| EP | 1801045 | 6/2007 |
| EP | 1941853 | 7/2008 |
| EP | 2233116 | 9/2010 |
| EP | 2238955 | 10/2010 |
| ES | 509706 | 11/1982 |
| ES | 520559 | 12/1983 |
| ES | 296211 | 12/1987 |
| ES | 200601373 | 7/2009 |
| ES | 2311349 | 9/2009 |
| FR | 2177355 | 11/1973 |
| FR | 2252961 | 7/1975 |
| FR | 0206208 | 12/1986 |
| FR | 1132325 | 10/2006 |
| FR | 2891811 | 4/2007 |
| GB | 191101501 | 0/1912 |
| GB | 439897 | 12/1935 |
| GB | 856389 | 12/1960 |
| GB | 941073 | 11/1963 |
| GB | 1096373 | 12/1967 |
| GB | 1126539 | 9/1968 |
| GB | 1346329 | 2/1974 |
| GB | 1412812 | 11/1975 |
| GB | 2045298 | 10/1980 |
| GB | 2115775 | 9/1983 |
| GB | 2288316 | 10/1995 |
| IT | 1374910 | 5/2010 |
| IT | 1374911 | 5/2010 |
| JP | 428364 | 3/1992 |
| JP | 542180 | 3/1993 |
| JP | 576566 | 10/1993 |
| JP | 626160 | 4/1994 |
| JP | 626161 | 4/1994 |
| JP | 6197925 | 7/1994 |
| JP | 9299398 | 11/1997 |
| JP | 10035621 | 2/1998 |
| JP | 10-277091 | 10/1998 |
| SE | 0602047 | 5/2007 |
| SE | 0601003-7 | 6/2007 |
| SE | 0601145-6 | 10/2009 |
| WO | WO9403301 | 2/1994 |
| WO | WO9747265 | 12/1997 |
| WO | WO 9747810 | 12/1997 |
| WO | WO9821134 | 5/1998 |
| WO | WO 9907319 | 2/1999 |
| WO | WO 9913813 | 3/1999 |
| WO | WO9932385 | 7/1999 |
| WO | WO 9965437 | 12/1999 |
| WO | WO 0143682 | 6/2001 |
| WO | WO 0172237 | 10/2001 |
| WO | WO0172237 | 10/2001 |
| WO | WO 2004007329 | 1/2004 |
| WO | WO 2005075163 | 1/2005 |
| WO | WO 2007029115 | 3/2007 |
| WO | WO 2007039800 | 4/2007 |
| WO | WO 2007/126347 A1 | 11/2007 |
| WO | WO 2008001209 | 1/2008 |
| WO | WO 2008155618 | 12/2008 |

OTHER PUBLICATIONS

Reciprocating Mechanism, Ingenious Mechanisms for Designers and Inventors, Franklin Jones vol. 1.

* cited by examiner

14 *Fig. 8*

REGISTERED STRETCH LAMINATE AND METHODS FOR FORMING A REGISTERED STRETCH LAMINATE

RELATED APPLICATIONS

This application claims the benefit of U.S. Provisional Patent Application Ser. No. 61/069,111, filed 12 Mar. 2008.

BACKGROUND OF THE INVENTION

The present invention relates to a laminated material formed for use in consumer products. Consumer products such as disposable hygiene products, cleaning products, non-hygienic applications, such as shoe protectors, form fitting dust covers, soft-fruit protectors, or any number of consumer products where an elastomeric characteristic is desired could employ the disclosed laminate. This invention also relates to methods and apparatuses for processing components of disposable hygiene products. More specifically, the invention relates to manufacturing a stretchable, preferably breathable laminate that is bonded at a plurality of bond sites.

Generally, diapers comprise an absorbent insert or patch and a chassis, which, when the diaper is worn, supports the insert proximate a wearer's body. Additionally, diapers may include other various patches, such as tape tab patches, reusable fasteners and the like. The raw materials used in forming a representative insert are typically cellulose pulp, tissue paper, poly, nonwoven web, acquisition, and elastic, although application specific materials are sometimes utilized. Usually, most of the insert raw materials are provided in roll form, and unwound and applied in assembly line fashion.

In the creation of a diaper, multiple roll-fed web processes are typically utilized. To create an absorbent insert, the cellulose pulp is unwound from the provided raw material roll and pulverized by a pulp mill. Discrete pulp cores are formed by a core forming assembly and placed on a continuous tissue web. Optionally, super-absorbent powder may be added to the pulp core. The tissue web is wrapped around the pulp core. The wrapped core is debulked by proceeding through a colander unit, which at least partially compresses the core, thereby increasing its density and structural integrity. After debulking, the tissue-wrapped core is passed through a segregation or knife unit, where individual wrapped cores are cut. The cut cores are conveyed, at the proper pitch, or spacing, to a boundary compression unit.

While the insert cores are being formed, other insert components are being prepared to be presented to the boundary compression unit. For instance, the poly sheet is prepared to receive a cut core. Like the cellulose pulp, poly sheet material is usually provided in roll form. The poly sheet is fed through a splicer and accumulator, coated with an adhesive in a predetermined pattern, and then presented to the boundary compression unit. In addition to the poly sheet, which may form the bottom of the insert, a two-ply top sheet may also be formed in parallel to the core formation. Representative plies are an acquisition web material and a nonwoven web material, both of which are fed from material rolls, through a splicer and accumulator. The plies are coated with adhesive, adhered together, cut to size, and presented to the boundary compression unit. Therefore, at the boundary compression unit, three components are provided for assembly: the poly bottom sheet, the core, and the two-ply top sheet.

A representative diaper chassis comprises nonwoven web material and support structure. The diaper support structure is generally elastic and may include leg elastic, waistband elastic and belly band elastic. The support structure is usually sandwiched between layers of the nonwoven web material, which is fed from material rolls, through splicers and accumulators. The chassis may also be provided with several patches, besides the absorbent insert. Representative patches include adhesive tape tabs, acquisition layer, ears, frontal tape, graphic appliqué, poly barrier, and resealable closures.

The process utilizes two main carrier webs; a nonwoven web which forms an inner liner web, and an outer web that forms an outwardly facing layer in the finished diaper. In a representative chassis process, the nonwoven web is slit at a slitter station by rotary knives along three lines, thereby forming four webs. One of the lines is on approximately the centerline of the web and the other two lines are parallel to and spaced a short distance from the centerline. The effect of such slicing is twofold; first, to separate the nonwoven web into two inner diaper liners. One liner will become the inside of the front of the diaper, and the second liner will become the inside of the back of that garment. Second, two separate, relatively narrow strips are formed that may be subsequently used to cover and entrap portions of the leg-hole elastics. The strips can be separated physically by an angularly disposed spreader roll and aligned laterally with their downstream target positions on the inner edges of the formed liners.

After the nonwoven web is sliced, an adhesive is applied to the liners in a predetermined pattern in preparation to receive leg-hole elastic. The leg-hole elastic is applied to the liners and then covered with the narrow strips previously separated from the nonwoven web. Adhesive is applied to the outer web, which is then combined with the assembled inner webs having elastic thereon, thereby forming the diaper chassis. Next, after the elastic members have been sandwiched between the inner and outer webs, an adhesive is applied to the chassis. The chassis is now ready to receive an insert.

To assemble the final diaper product, the insert must be combined with the chassis. The placement of the insert onto the chassis occurs on a placement drum or at a patch applicator. The inserts are provided to the chassis on the placement drum at a desired pitch or spacing. The generally flat chassis/insert combination is then folded so that the inner webs face each other, and the combination is trimmed. A sealer bonds the webs at appropriate locations prior to individual diapers being cut from the folded and sealed webs.

Roll-fed web processes typically use splicers and accumulators to assist in providing continuous webs during web processing operations. A first web is fed from a supply wheel (the expiring roll) into the manufacturing process. As the material from the expiring roll is depleted, it is necessary to splice the leading edge of a second web from a standby roll to the first web on the expiring roll in a manner that will not cause interruption of the web supply to a web consuming or utilizing device.

In a splicing system, a web accumulation dancer system may be employed, in which an accumulator collects a substantial length of the first web. By using an accumulator, the material being fed into the process can continue, yet the trailing end of the material can be stopped or slowed for a short time interval so that it can be spliced to leading edge of the new supply roll. The leading portion of the expiring roll remains supplied continuously to the web-utilizing device. The accumulator continues to feed the web utilization process while the expiring roll is stopped and the new web on a standby roll can be spliced to the end of the expiring roll.

In this manner, the device has a constant web supply being paid out from the accumulator, while the stopped web material in the accumulator can be spliced to the standby roll. Examples of web accumulators include that disclosed in U.S.

patent application Ser. No. 11/110,616, which is commonly owned by the assignee of the present application, and incorporated herein by reference.

SUMMARY OF THE INVENTION

The present invention relates to an elastic netting like product, such as that produced and commercially available by CONWED, carried between two outer layers of laminate. The open areas of the netting like structure are registered bond points of the anvil roll.

This allows the netting to retract between the bond points, pulling the material together in a gathering type fashion, but preferably without introducing the elastic netting product into the bond sites. The netting is applied preferably under tension/elongated prior to bonding the outer layers, and after the outer layers are bonded, the netting is allowed to relax, resulting in a gathering type reaction from the outer layers.

The method allows for the outer layers of the laminate to be directly bonded to each other without the stretch engine material being introduced into the bond. Typically the stretch material differs from the outer cover material, making it difficult to bond non-homogeneous layers together, and allowing a strong bond to be created in the absence of a stretch engine.

The resulting laminate can be uni-directional or bi-directional in its stretch characteristics, depending on the laminate characteristics desired. Any number of stretching characteristics can be applied to the laminate depending on the webbing itself (e.g., cross strand oriented). Further, different stretch states at the time and point of bonding can be used to impart different stretch directions and conditions.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
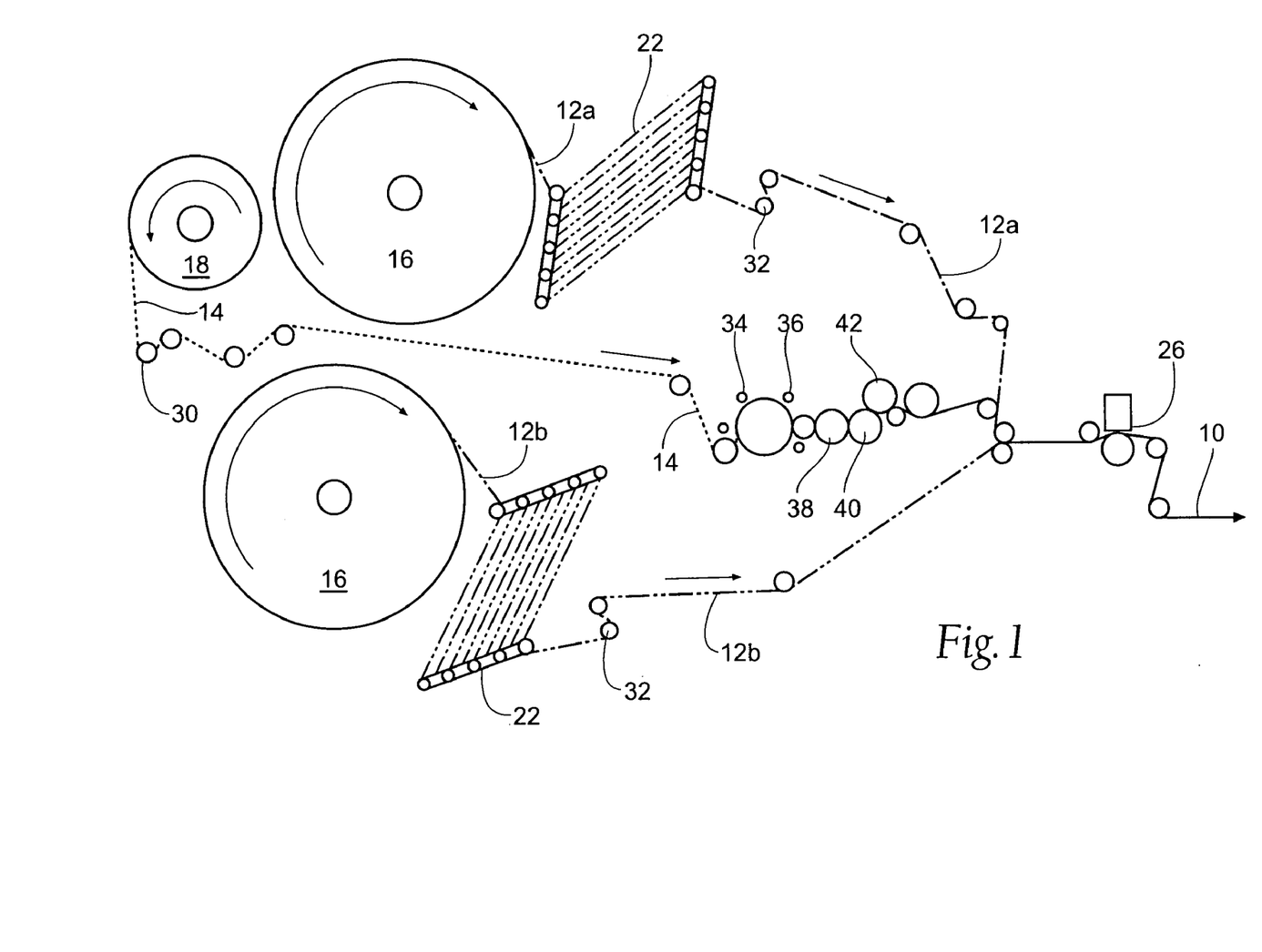
FIG. 1 is a schematic view of an apparatus for forming a registered stretch laminate.

Referring now to FIG. 1, a schematic view of an apparatus for forming a registered stretch laminate is shown. A blocking isolation s-wrap 30 can be provided for carrying and tensioning elastomeric layer 14.

Elastomeric layer 14 is preferably a net-like material, defined by strands bonded at crossing points between strands. Plastic netting with appropriate elastomeric properties create a stretch-engine that allows materials that are not stretchable to stretch.

The integral joints of such a net-like material 14 provide strength to materials and help maintain dimensional stability in products. In addition, the joints create a consistent web for a cleaner and smoother manufacturing process. The web-like structure of such a net-like material 14 is easier to handle than individual strands and requires less down time for strand breaks. Preferably, such a net-like material 14 has stretch properties in at least two dimensions.

Net-like material 14 enters a first cross machine direction stretch wheel 34 on one side of the web 14 in the direction of travel, and then a second cross machine direction stretch wheel 36 on the other side of the web 14 in the direction of travel. First, second and third stretch rollers 38, 40, and 42 are provided. In conjunction with the stretch wheels 34 and 36, and the stretch rollers 38, 40 and 42, the elastomeric layer 14 is stretched in a direction and tension that is user defined based on preference of the elasticity of the lamination 10. It is noted that stretching can be supplied to elastic layer 14 in any of the cross machine direction, the machine direction, or a combination of both, depending on the desired end result. It is preferred that the elastic layer 14 being carried between non-elastomeric layers 12a and 12b be in a stretched state before the bonding operation takes place.

Figure 5:
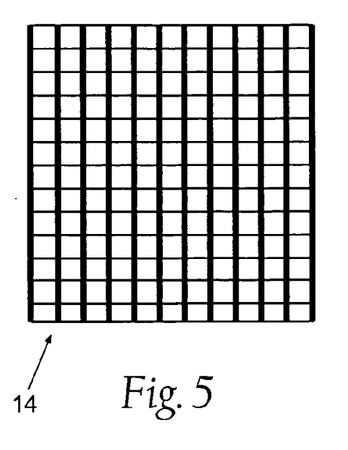
FIGS. 5-8 are top views of alternate embodiments of an elastic layer.
Figure 6:
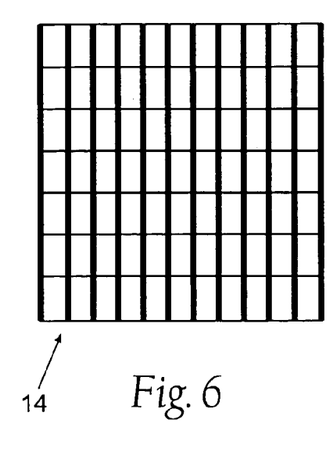
Figure 7:
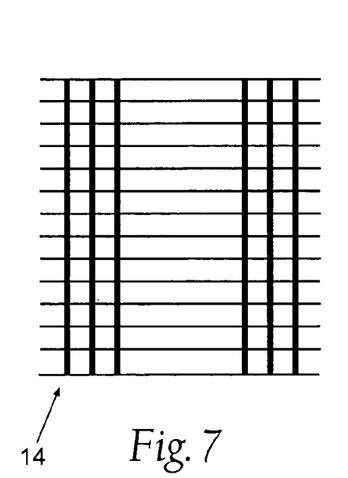
Figure 8:
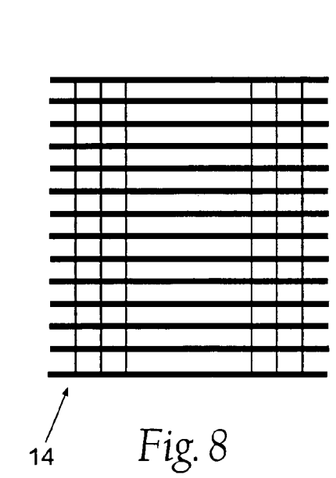

Referring now to FIGS. 5-8 top views of alternate embodiments of an elastic layer 14, are shown. The stretch engine webbing or net-like material 14 can be made of a non-uniform matrix of strands to vary the stretch characteristics desired. For example, as shown in FIG. 5, a stiffer vertical strand material is shown relative to a more pliable strand material in the horizontal orientation. The strand count can be varied across the length or width of the web to increase or decrease stretchability in either direction as desired, as shown in FIG. 6. FIGS. 7 and 8 show alternate ways of varying the stretch characteristics, including varying distance between strands, varying strand material between the machine and cross-machine direction, varying strand count, varying the density of the weave, and using different bond patterns at different bond points.

If these different strand types, for instance stretchy and stiff, are used in cross strands and material direction strands, the stretch characteristics will likewise reflect the strand composition.

An ultrasonic bonding station 26 is provided to join the non-elastomeric layers 12a and 12b, with the stretched elastomeric layer 14 sandwiched between the non-elastomeric layers 12a and 12b. Because the elastomeric layer 14 has been stretched, yet the non-elastomeric layers 12a and 12b have not been stretched, when the two layers are joined, the elastomeric layer 14 still will have stored the stretch. In an alternate embodiment, any one, two or three of the elastomeric layer 14 and the non-elastomeric layers 12a and 12b are bonded in a stretched configuration. Alternatively, none of the elastomeric layer 14 and the non-elastomeric layers 12a and 12b are bonded in a stretched configuration.

Bonding station 26 can provide any method of bonding such as ultrasonic, thermal pressure, registered adhesive, or any combination thereof, depending on user preference for machine configuration.

Non-elastomeric layers 12a and 12b can be of any suitable material, and they themselves could be a laminate.

The resulting laminate can be uni-directional or bi-directional in its stretch characteristics, depending on the laminate characteristics desired. Any number of stretching characteristics can be applied to the laminate depending on the webbing itself (e.g., cross strand oriented). Further, different stretch states at the time and point of bonding can be used to impart different stretch directions and conditions.

Next, the elastomeric layer 14 is taken off of tension, which results in a gathering of the elastomeric layer 14 to create the preferred stretchable laminate.

In one known type of accumulator, the swinging dancer arm type, there is a set of spaced apart rollers on a swingable dancer arm cooperating with another set of rollers on an arm that may be stationary or swingable. A web is looped back and forth between the sets of rollers on opposed arms in a serpentine fashion. When the swingable arm is swung away from the other arm a substantial length of web is accumulated. During normal running of the web the arms will be urged to their maximum practical separation from each other to accumulate the maximum length of web. If the infeed web is slowed or stopped for a short time the tension in the web urges the arms to the minimum separation position in order to make the accumulated web available to the machine. After infeed to the accumulator is resumed the arms separate again and return to their original position to accumulate and store another length of web.

In another known type of accumulator, the linear sliding carriage type, there is a set of rollers mounted on a movable carriage which can run linearly toward or away from a set of corresponding rollers which may either be stationary or similarly slidably mounted. During normal operation of the accumulator, the two sets of rollers will be slid to their maximum practical separation to accumulate the maximum amount of web. If the infeed supply to the web accumulator is slowed or stopped, the rollers will be slid toward each other to allow the stored web to be paid out. As the web infeed is returned to regular operational speed the movable rollers slide back toward the original position to accumulate another length of web. Metering stations 32 can be provided to analyze the speed of the infeed of the layers 12*a* and 12*b*, and to assist in determining how much material remains on infeed rolls.

Figure 2:
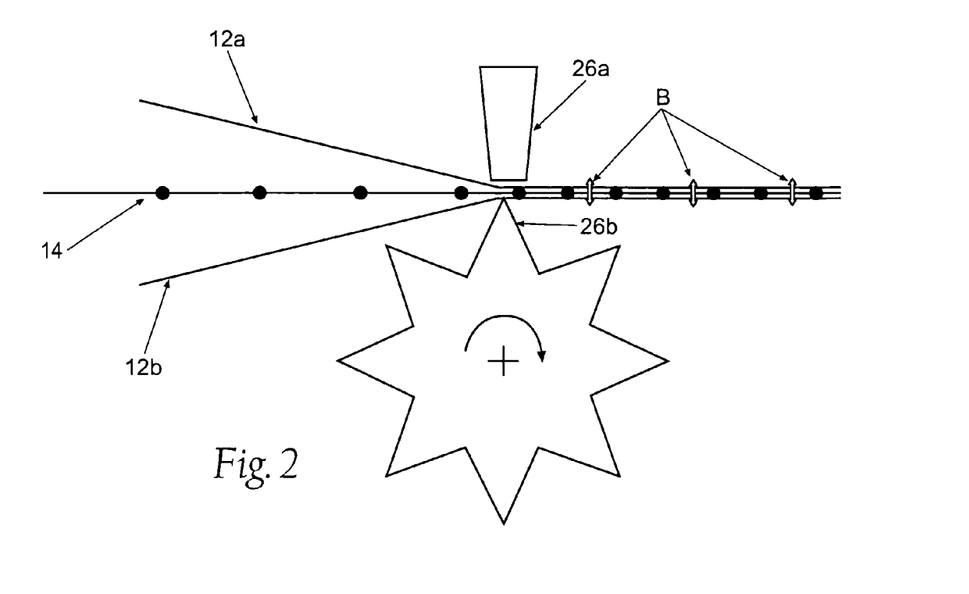
FIG. 2 is a schematic view of the laminate formed thereby.

Referring now to FIG. 2, a schematic view of the laminate formed by the process described above is shown. As can be seen, stretchable net-like material 14 is fed, in a stretched condition, into the bonding station 26 comprising horn 26*a* and anvil 26*b*. At the bonding station 26, layers 12*a* and 12*b* sandwich the stretched net-like material 14, and after bonding together layers 12*a* and 12*b,* net-like material 14 is allowed to relax.

Figure 3:
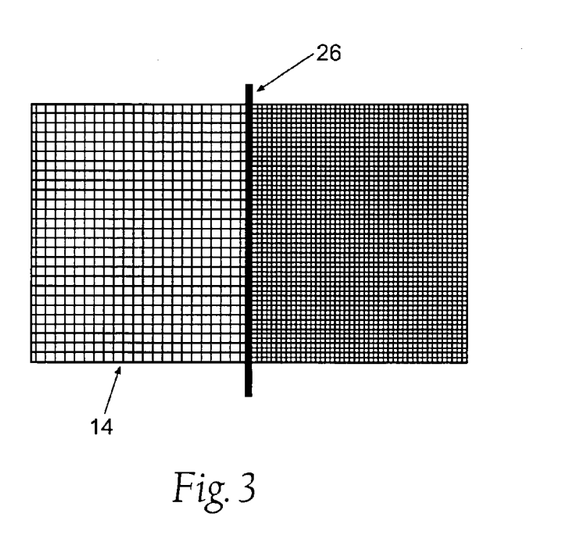
FIG. 3 is a top view of the elastic layer of the present invention in a first stretched state, and, following bonding, a second relaxed state.

Referring now to FIG. 3, a top view of the net-like material 14 is shown in a first stretched state to the left of bonding station 26, and, following bonding at bonding station 26, a second relaxed state to the right.

Figure 4:
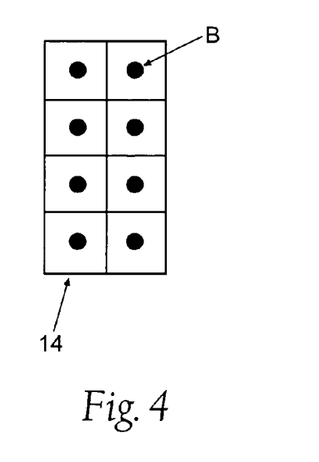
FIG. 4 is a top view of a representative elastic layer, with bond sites between the net like fibers of the elastic layer.

Referring now to FIG. 4, a top view of a net-like material 14 is shown without layers 12*a* and 12*b*. In this view, preferably bond sites B are shown between the net like fibers of the net-like material 14. Any number of bond patterns can be applied, such as geometric shapes such as circles, pyramids, half moons, x-shaped, or combinations of them for different aesthetics and material characteristics as desired.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim

1. A method of forming a registered stretch bond laminate, the method comprising:
   providing a first material layer;
   providing a stretched elastomeric layer, the elastomeric layer comprising a net like structure having strands intersecting at crossing points between said strands, thereby forming a stretch engine having a plurality of void spaces between said intersecting crossing points;
   providing a second material layer;
   registering bond sites relative to said void spaces between said intersecting crossing points and bonding said first and said second material layers to each other at said bond sites, creating a bond through said void spaces between said intersecting crossing points, thereby creating a bonded laminate.

2. A method according to claim 1, wherein at least one of said first and second material layers is a non-woven layer.

3. A method according to claim 1, wherein said bonding is performed ultrasonically.

4. A method according to claim 1, the method further comprising allowing said bonded laminate to relax following the bonding step.

5. A method according to claim 1, wherein the strands are provided in a uniform matrix.

6. A method according to claim 1, wherein the strands are provided in a non- uniform matrix.

7. A method of forming a registered laminate, the method comprising:
   providing a first material layer;
   providing an elastomeric layer stretched in at least one of a machine direction and a cross-direction, the elastomeric layer comprising a net like structure having strands intersecting at crossing points between said strands, thereby forming a stretch engine having a plurality of void spaces between said intersecting crossing points;
   providing a second material layer;
   registering bond sites relative to said void spaces between said intersecting crossing points and bonding said first and said second material layers to each other at bond sites, creating a bond through said void spaces between said intersecting crossing points, thereby creating a bonded laminate.

8. A method according to claim 7, wherein at least one of said first and second material layers is a non-woven layer.

9. A method according to claim 7, wherein said bonding is performed ultrasonically.

10. A method according to claim 7, the method further comprising allowing said bonded laminate to relax following the bonding step.

11. A method according to claim 7, wherein the strands are provided in a uniform matrix.

12. A method according to claim 7, wherein the strands are provided in a non-uniform matrix.

13. A method of forming a registered laminate, the method comprising:
   providing a first material layer;
   providing an elastomeric layer, the elastomeric layer comprising a net like structure having strands intersecting at crossing points between said strands, thereby forming a stretch engine having a plurality of void spaces between said intersecting crossing points;
   providing a second material layer;
   bonding said first and said second material layers to each other at bond sites, creating a bond through said void spaces between said intersecting crossing points; thereby creating a bonded laminate.

14. A method according to claim 13, wherein at least one of said first and second material layers is a non-woven layer.

15. A method according to claim 13, wherein said bonding is performed ultrasonically.

16. A method according to claim 13, wherein the strands are provided in a uniform matrix.

17. A method according to claim 13, wherein the strands are provided in a non-uniform matrix.

18. A method of forming a registered laminate, the method comprising:

providing a first material layer;

providing a elastomeric layer, the elastomeric layer comprising a net like structure having strands intersecting at crossing points between said strands, having a plurality of void spaces between said intersecting crossing points;

providing a second material layer;

registering bond sites relative to a position of the net like structure, and bonding said first and second material layers, thereby creating a bonded laminate.

19. A method of forming a registered laminate according to claim 18, wherein said elastomeric layer is provided in a stretched condition.

20. A method of forming a registered laminate according to claim 19, wherein said elastomeric layer is stretched in at least one of a machine direction and a cross-machine direction.

* * * * *